United States Patent
Furukawa

[19]

[11] Patent Number: 6,051,945
[45] Date of Patent: Apr. 18, 2000

[54] ANTI-PINCH SAFETY SYSTEM FOR VEHICLE CLOSURE DEVICE

[75] Inventor: Hideo Furukawa, Dublin, Ohio

[73] Assignee: Honda Giken Kogyo Kabushiki Kaisha, Tokyo, Japan

[21] Appl. No.: 09/236,852

[22] Filed: Jan. 25, 1999

[51] Int. Cl.⁷ ...................................................... H02P 1/00
[52] U.S. Cl. .......................... 318/280; 318/480; 318/264; 318/283; 318/445; 318/466
[58] Field of Search ..................... 318/480, 264, 318/283, 445, 446, 280

[56] References Cited

U.S. PATENT DOCUMENTS

| | | |
|---|---|---|
| 4,467,249 | 8/1984 | Swearingen, Jr. . |
| 4,940,964 | 7/1990 | Dao . |
| 5,085,004 | 2/1992 | Beauprez . |
| 5,105,131 | 4/1992 | Schap ...................................... 318/282 |
| 5,422,551 | 6/1995 | Takeda et al. . |
| 5,461,826 | 10/1995 | Heckel et al. . |
| 5,585,702 | 12/1996 | Jackson et al. . |
| 5,585,705 | 12/1996 | Brieden . |
| 5,616,997 | 4/1997 | Jackson et al. . |
| 5,723,960 | 3/1998 | Harada . |
| 5,739,747 | 4/1998 | Flick . |
| 5,955,854 | 9/1999 | Zhang et al. .............................. 318/480 |

FOREIGN PATENT DOCUMENTS 6-32646  4/1994  Japan .

OTHER PUBLICATIONS

"Automotive Industries" Mar. 1998, p. 87.

*Primary Examiner*—Karen Masih
*Attorney, Agent, or Firm*—Graham & James LLP

[57] ABSTRACT

An anti-pinch safety system includes an electric motor operatively coupled to a vehicle opening device to move the vehicle opening device between an open position and a closed position, and a sensor operatively coupled to the electric motor for sensing velocity of movement of the vehicle opening device. A processor is coupled to each of the sensor and the electric motor, along with a memory containing stored instructions to be executed by the processor. The stored instructions include: a) calculating a pinching force of the vehicle opening device in accordance with changes in velocity sensed by the sensor; b) detecting a pinched condition by comparing the pinching force to a predetermined force value; and c) stopping closing movement of the vehicle opening device when the pinched condition is detected.

24 Claims, 8 Drawing Sheets

ANTI-PINCH SAFETY SYSTEM FOR VEHICLE CLOSURE DEVICE

BACKGROUND OF THE INVENTION

1. Field of the Invention

The present invention relates to drive systems for motor vehicle closure devices, such as windows. More particularly, the invention relates to a safety feature for a vehicle window that detects that an object has become pinched in a vehicle window as it is commanded to close and thereby reverses direction of the window to alleviate the pinched condition.

2. Description of Related Art

Power windows for motor vehicles are very common throughout the world. In a typical vehicle power window, an electric motor is used to raise or lower the window under the control of a switch operated by an occupant of the vehicle. In view of the significant convenience that they provide over manually moved windows, power windows have become a standard feature of most new motor vehicles.

Despite their widespread consumer acceptance, power windows pose a serious risk of harm to objects that are inadvertently caught between the window and the sash as the window is closed. The closing torque applied by the electric motor to the window results in substantial force that can injure an individual's limb or head left protruding through the open window. This risk is particularly serious with small children that may be enticed to use the power windows without parental supervision, and which can be severely injured if caught between the window and sash. In view of the potential danger posed by power windows, certain governmental regulations dictate the maximum amount of force that may be applied by the electric motor in closing the window.

To prevent such injuries from occurring, motor vehicles have been provided with safety systems that detect the presence of a foreign object pinched between the window and sash. Once a pinched object is detected, upward movement of the window is halted and the window is moved downward to free the object. There are two types of safety systems in common usage, including the "differential" type and the "absolute" type.

The differential type of safety system recognizes a pinched condition from a detected change in window velocity. More particularly, the window moves upward with a velocity (v) measured by a sensor that detects the rotational rate of the electric motor. Generally, the window is moved at a constant velocity (v). In a pinched condition, however, the velocity abruptly drops. The sensor can also detect changes in velocity over time (dv/dt), and the safety system thereby recognizes the pinched condition from the detected dv/dt. The differential type of safety system has a serious drawback, however, in that there is a lag between the time that the pinched condition begins and the time at which sufficient velocity information is collected to detect and reverse the pinched condition. Since the safety system periodically samples the velocity v, it is necessary for a sufficient number of samples to be collected before an accurate dv/dt value can be recognized. While this time lag is very slight and on the order of milliseconds, it should be appreciated that a significant amount of harm may have already occurred to a foreign object caught between the window and sash before the pinched condition is recognized and corrected by the safety system.

An especially serious failure mode for the differential type of safety system is the "no-clearance condition" in which an object is already in close contact with the window and sash prior to the time the window is commanded to close. Since the window was not in motion before contacting the object, dv/dt will be zero as there is no change in velocity. The electric motor will continue to apply closing force to the window against the object until the operator recognizes the pinched condition and manually changes it to reverse direction.

In contrast, the absolute type of safety system recognizes a pinched condition when the applied motor torque exceeds a predetermined limit. The torque produced by the electric motor is generally proportional to the electric current drawn by the electric motor. In a pinched condition, the presence of a foreign object between the window and sash represents a frictional force that is opposite in direction to the applied motor torque. As a result, the electric motor draws additional current to compensate for the increased frictional force. The safety system monitors the current drawn by the electric motor, and recognizes the pinched condition when the current exceeds a predetermined limit.

The absolute type of safety system would successfully detect a pinch in the no-clearance condition by the increase in motor current, and therefore is advantageous in that particular situation over the differential type of safety system. Nevertheless, there is also a time lag in the absolute type of safety system as the current level applied to the electric motor slowly increases to the threshold value. As in the differential type of safety system, this time lag may result in a significant amount of harm to a foreign object pinched by the window. Thus, both the differential type and the absolute type of safety systems do not provide entirely satisfactory solutions to the problem of detecting a pinched condition in a motor vehicle power window.

Thus, it would be desirable to provide an improved safety system for a motor vehicle power window. Such an improved safety system should have the beneficial aspects of the differential and absolute safety systems known in the art, without the serious drawbacks of these systems described above.

SUMMARY OF THE INVENTION

In accordance with the teachings of the present invention, an improved safety apparatus for operating a motor vehicle opening device is provided. The safety device detects the presence of an object pinched within the opening device by accurately calculating the pinching force $F_P$ exerted by the object opposite to the direction of the closing force of the opening device. The accuracy of the pinching force $F_P$ determination is improved by considering changes in velocity of the opening device.

An embodiment of the invention includes an electric motor operatively coupled to the vehicle opening device to move the vehicle opening device between an open position and a closed position. A sensor is operatively coupled to the electric motor for sensing the velocity of movement of the vehicle opening device. A processor is coupled to each of the sensor and the electric motor, along with a memory containing stored instructions to be executed by the processor. The stored instructions include: a) calculating a pinching force of the vehicle opening device in accordance with changes in velocity sensed by the sensor; b) detecting a pinched condition by comparing the pinching force to a predetermined force value; and c) stopping closing movement of the vehicle opening device when the pinched condition is detected.

A more complete understanding of the improved anti-pinch safety system for a vehicle closure device will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for an improved safety system for a motor vehicle power window, by combining beneficial aspects of the differential and absolute safety systems into a more responsive pinch detection system. In the detailed description that follows, like reference numerals are used to describe like elements illustrated in one or more of the figures.

Figure 1:
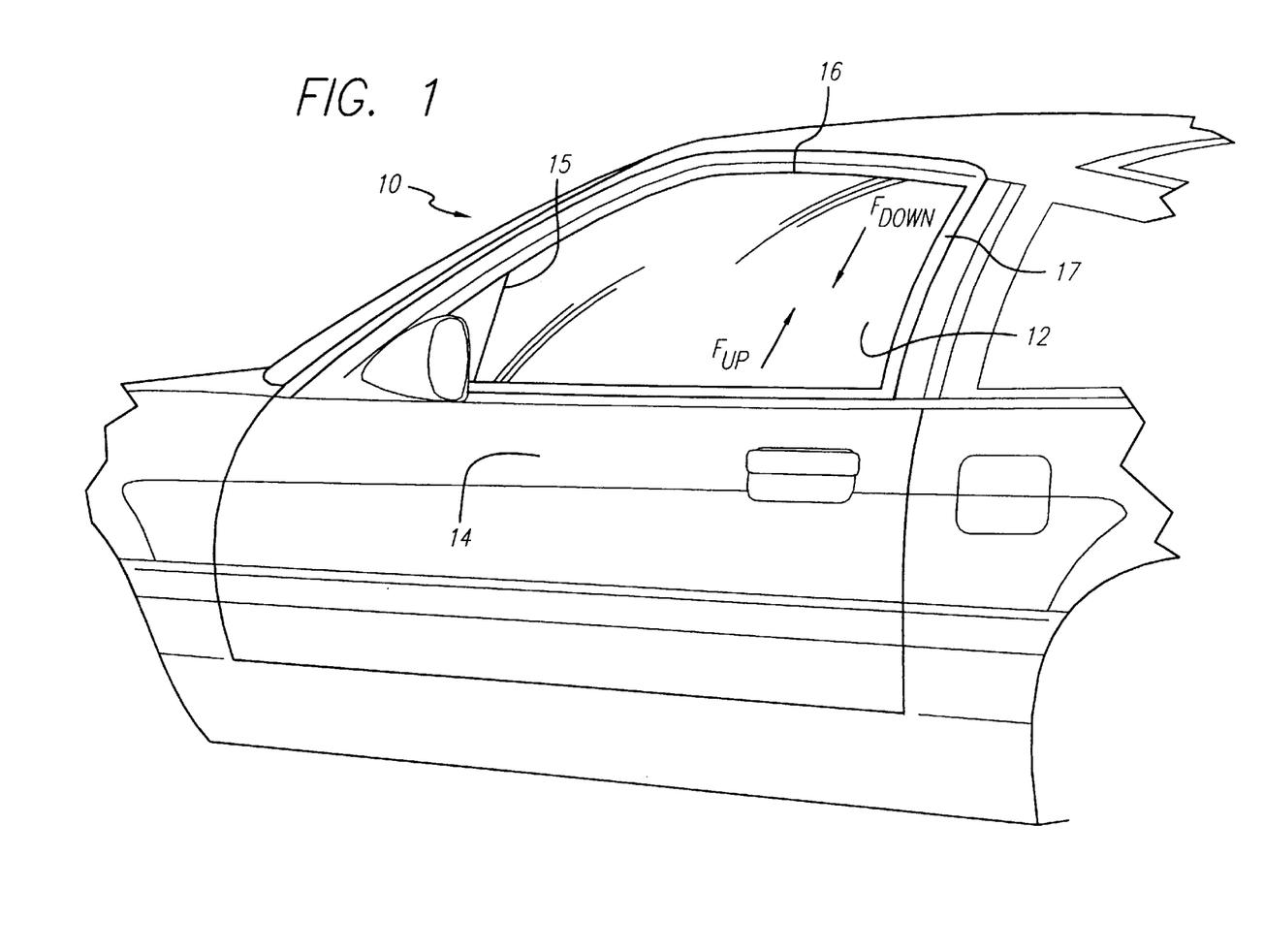
FIG. 1 is a perspective view of a motor vehicle window.
Figure 2:
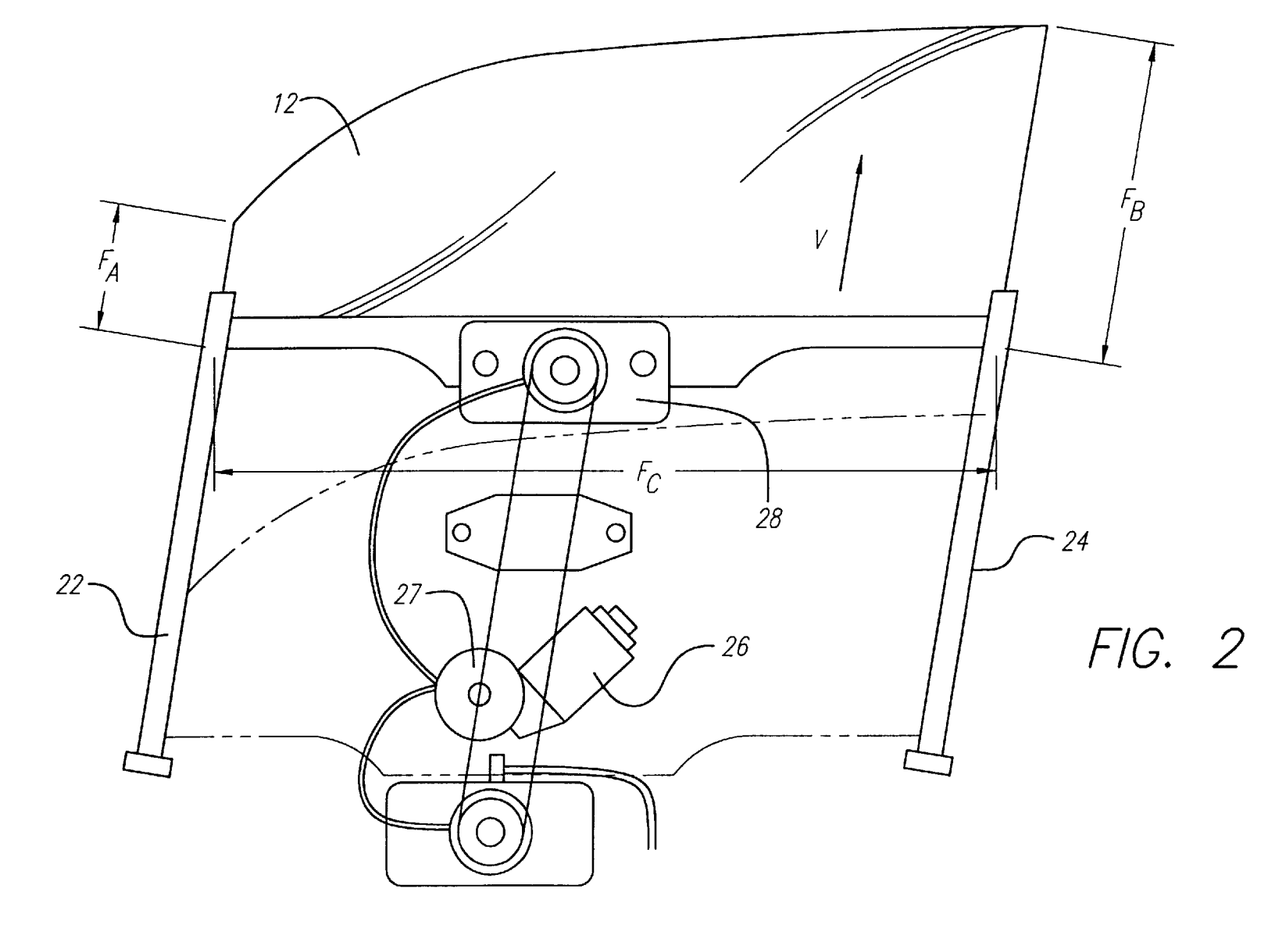
FIG. 2 is a side view of the motor vehicle window illustrating the mechanism for raising and lowering the window.

Referring first to FIGS. 1 and 2, a motor vehicle window 10 is illustrated. As shown in FIG. 1, the window 10 depicts a driver's side window of a motor vehicle, but it should be appreciated that the inventive concepts discussed herein are equally applicable to any power window for a motor vehicle. The vehicle window 10 is provided in a door 14 and comprises a transparent window pane 12 that is moveable between a fully closed position (as shown) and a fully open position. The window pane 12 is bounded by a window frame comprising a leading edge frame 15, a sash 16, and a trailing edge frame 17.

FIG. 2 illustrates an exemplary regulator mechanism for moving the window pane 12, which is provided within the motor vehicle body below the window. The window pane 12 is moveable within a front run-channel 22 and a rear run-channel 24. The window pane 12 also engages a seal (not shown) that extend along the bottom of the window frame of the door 14 to prevent leakage of moisture or air into the motor vehicle. The regulator mechanism for moving the window pane 12 includes an electric motor 26 engaged with a pulley 27. A slide bracket 28 is coupled to a bottom portion of the window pane 12 below the bottom of the window frame such that it is hidden within the door panel. The slide bracket 28 is connected to a cable, which is engaged with the pulley 27. When the electric motor 26 is energized, the cable causes the slide bracket 28 to move vertically, further causing the window pane 12 to move vertically within the front run-channel 22 and the rear run-channel 24. It should be appreciated that the present invention is equally applicable to other well known types of window regulator mechanisms, such as the arm and toothed-sector type or twisted-cable type.

Figures 3, 9:
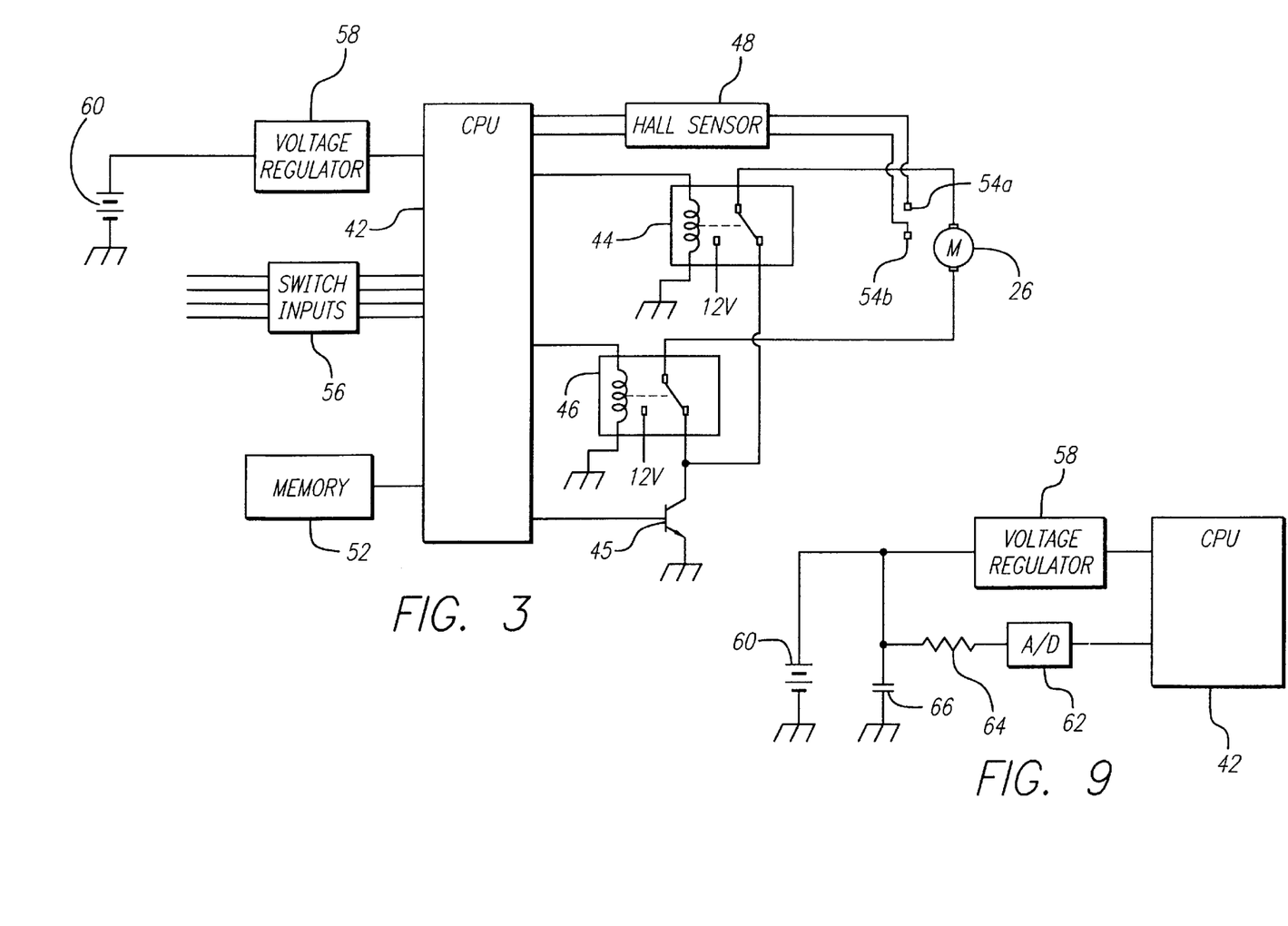
FIG. 3 is a block diagram illustrating control circuitry for a power window.
FIG. 9 is a block diagram illustrating an alternative embodiment of the control circuitry of FIG. 3.

The vehicle power windows are controlled by a circuit illustrated in FIG. 3. The window control circuit includes a CPU 42, an opening relay 44, a closing relay 46, and a Hall sensor interface 48. The CPU 42 controls the operation of the vehicle windows, and may be provided by a microprocessor, microcontroller, application specific integrated circuit (ASIC), or other like electronic device. A non-volatile memory 52, such as a read only memory (ROM) or electrically erasable programmable ROM (EEPROM), provides stored instructions and other data utilized by the CPU 42. The CPU 42 is further coupled to a switch input interface 56 which receives signals from switches disposed in the motor vehicle used to command the opening and closing of the windows. The CPU 42 is also coupled to a voltage regulator 58 which regulates the DC power provided by the vehicle battery 60.

The CPU 42 controls the operation of the motor 26 using the relays 44, 46. The motor 26 further comprises a DC motor mechanically coupled to the vehicle window as described above, such that the window is driven up if a positive DC voltage is applied across the motor terminals, and the motor is driven down if a negative DC voltage is applied across the motor terminals. Each of the opening relay 44 and the closing relay 46 include a trigger terminal coupled to an inductive coil, a pole terminal coupled to the pole of a switch, and a pair of switch terminals. The opening relay 44 and the closing relay 46 are each coupled to the CPU 42, with the opening relay 44 having a pole terminal coupled to one of the motor terminals and the closing relay 46 having a pole terminal coupled to the other one of the motor terminals. A first switch terminal of each of the opening and closing relays 44, 46 is coupled to a DC voltage source, and a second switch terminal is coupled to ground through a transistor 45.

The poles of the opening and closing relays 44, 46 are normally biased to the second switch terminal, so that the motor terminals are each coupled to ground and there is no DC potential across the motor terminals. To command the window to open, the CPU 42 provides a signal to the opening relay 44 causing its pole to switch to the first switch terminal. This couples one of the motor terminals to the DC voltage source, causing the electric motor 26 to drive in a first direction to open the window. Conversely, to command the window to close, the CPU 42 provides a signal to the closing relay 46 causing its pole to switch to the first switch terminal. This couples the other one of the motor terminals to the DC voltage source, causing the electric motor 26 to drive in a second direction to close the window.

The electric motor 26 further includes an annular magnet mounted on the rotary shaft of the motor. The Hall sensor interface 48 is further coupled to sensor elements 54a, 54b, which are disposed around the magnet and spaced from each other by 90°. The Hall sensor elements 54a, 54b detect the poles of the magnet to generate electrical currents. This way, as the magnet rotates, the Hall sensor elements 54a, 54b provide pulse signals having a frequency corresponding to the velocity of rotation of the magnet. The Hall sensor interface 48 receives the pulse signals from the Hall sensor elements 54a, 54b, and provides signals to the CPU 42 corresponding to the velocity and direction of movement of the magnet, and hence the window. The CPU 42 also determines the instantaneous position of the window from the Hall sensor elements 54a, 54b signals.

Figure 6:
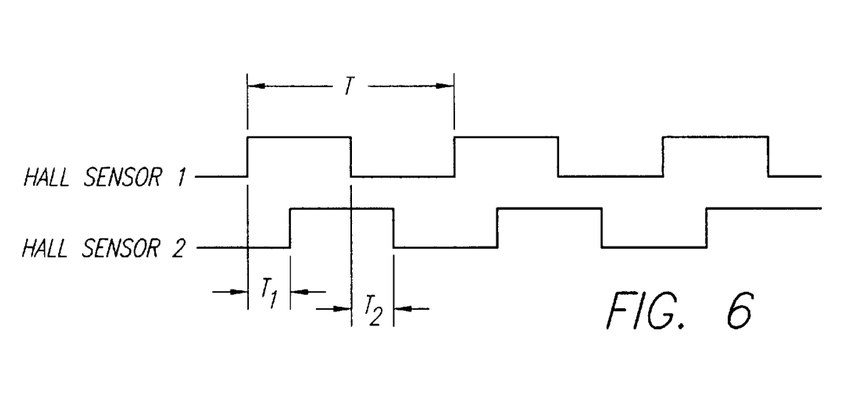
FIG. 6 illustrates respective pulse trains provided from two Hall elements showing the rotational rate of an electric motor of a power window system.

FIG. 6 illustrates pulse sequences provided from each of the Hall sensor elements 54a, 54b (respectively identified as Hall sensors 1 and 2). Each of the pulse sequences comprise a series of square wave pulses, with each pulse having a period T. When the window is moved in a first direction, e.g., opening, the positive rising edge of a pulse of the first pulse sequence precedes the positive rising edge of a corresponding pulse of the second pulse sequence by 90° (as shown in FIG. 6). Conversely, when the window is moved in a second direction, e.g., closing, the positive rising edge of a pulse of the first pulse sequence follows the positive rising edge of a corresponding pulse of the second pulse sequence by 90° (not shown). Accordingly, the CPU 42 can determine whether the window is opening or closing by comparing the corresponding pulses of the two pulse sequences.

As known in the art, the velocity v of movement of the window can be determined by from the time period T. Since one complete rotation of the rotary shaft of the electric motor 26 corresponds to a fixed distance of window movement D, the velocity v can be calculated from D/T. Moreover, the total distance that the window pane 12 is moved in a given direction can be determined from a count of the pulses of one of the pulse sequences of FIG. 6. This way, the CPU 42 can keep track of the instantaneous position of the window pane 12 as it is moved upward and downward. A conventional counter provided within the CPU 42 can be incremented as the window pane is moved in a first direction, and decremented as the window pane is moved in a second direction.

Figure 7A:
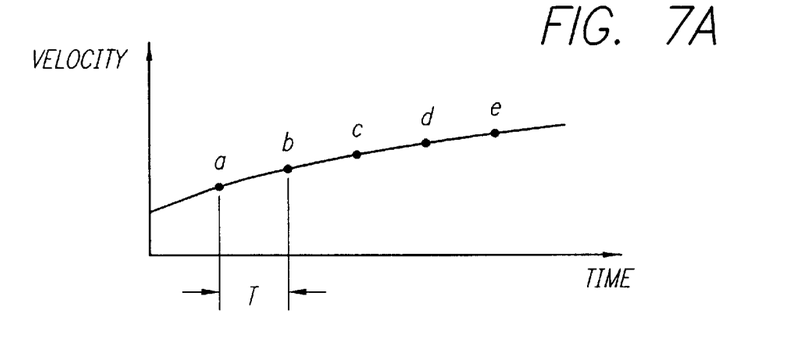
FIG. 7A and 7B are graphs illustrating velocity samples taken from one and two Hall element pulse trains, respectively.

FIG. 7A depicts a curve showing the window velocity v over time fitted from plural successive velocity samples (shown as a, b, c, etc.) taken from a single Hall sensor pulse sequence. A single sample is provided for each period T of the pulse sequence. The instantaneous change in velocity $dv/dt$ is thereby determined from the slope of the curve. A disadvantage of deriving the velocity curve from a single pulse sequence is that the velocity data is updated only once per period T. As discussed above, it is desirable to avoid any delays in detecting changes in velocity so that a pinched condition can be detected as rapidly as possible.

Figure 7B:
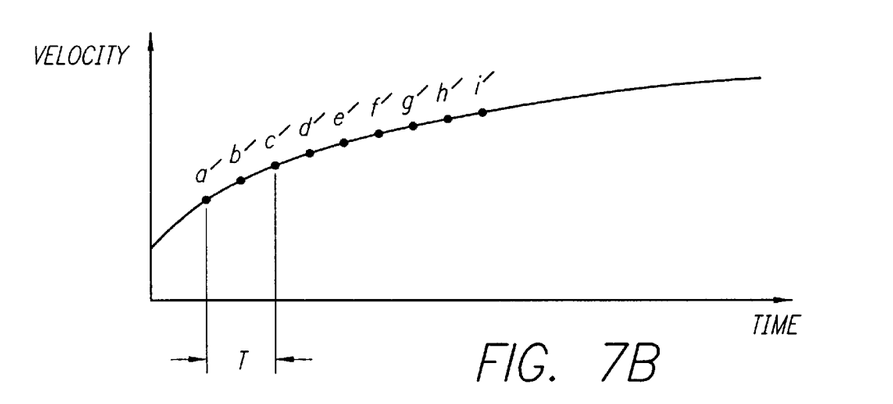

A more responsive technique for deriving the window velocity v is shown in FIG. 7B, which depicts a curve fitted from plural successive samples (shown as a, b, c, etc.) taken from both Hall sensor pulse sequences. In particular, the time between the positive rising edges of corresponding pulses of each respective pulse sequence $T_1$ and the time between the negative falling edges of corresponding pulses of each respective pulse sequence $T_2$ are each used to derive velocity samples (see FIG. 6). Since the corresponding pulses are 90° out of phase, the rotary shaft of the electric motor 26 turns one-quarter rotation (D/4) during each one of the time periods $T_1$, $T_2$. The velocity v can thereby be calculated from $D/4T_1$ and $D/4T_2$. As shown in FIG. 7B, the velocity curve is derived from data that is updated twice during every period T of one of the pulse sequences. This provides more accurate window velocity information in which sudden changes in velocity, i.e., $dv/dt$, are detected sooner.

Returning briefly now to FIG. 1, it should be appreciated that movement of the window pane 12 represents a balance between an upward directed force ($F_{UP}$) and a downward directed force ($F_{DOWN}$). These two forces are related in accordance with the following equilibrium equation:

$$F_{UP} - F_{DOWN} = m\, dv/dt$$

in which m is the mass of the window pane 12 and the other moving parts of the window regulator mechanism described above with respect to FIG. 2, and $dv/dt$ is the change in velocity (i.e., acceleration) of the window movement. The upward directed force $F_{UP}$ is equivalent to $F_{MOTOR}\,\rho$, where $F_{MOTOR}$ is the torque applied by the electric motor 26 and $\rho$ is a constant that combines the window regulator mechanism efficiency coefficient and the motor tolerance coefficient. The regulator mechanism efficiency coefficient is a measured value based on the efficiency of the power window regulator mechanism, and is used to account for the force component caused by the regulator mechanism. The motor tolerance coefficient is a measured value that is used to normalize the power window torque used in anti-pinch calculations (described below). The motor tolerance coefficient corrects for motor production tolerances and is based on actual measured power window motor torque output.

The downward directed force $F_{DOWN}$ is equivalent to $(F_A+F_B+F_C)+mg$, in which $F_A$ is the coefficient of friction between the window pane 12 and the leading edge frame 15, $F_B$ is the coefficient of friction between the window pane and the seal at the base of the window, $F_C$ is the coefficient of friction between the window pane and the trailing edge frame 17, and g is the acceleration of gravity (see FIG. 2), whereby the term mg corresponds to the weight of the window pane 12. When an object has become pinched between the window pane 12 and the sash 16, the frictional force exerted by the pinched object ($F_P$) is determined in accordance with the following expression:

$$F_P = F_{MOTOR}\,\rho - (F_A+F_B+F_C) - mg - m\, dv/dt$$

A pinched condition is detected when the calculated value of $F_P$ exceeds a predetermined value, such as 90 newtons. As will be further described below, the present invention improves the accuracy of the $F_P$ calculation, enabling more effective detection of a pinched condition.

Figure 4:
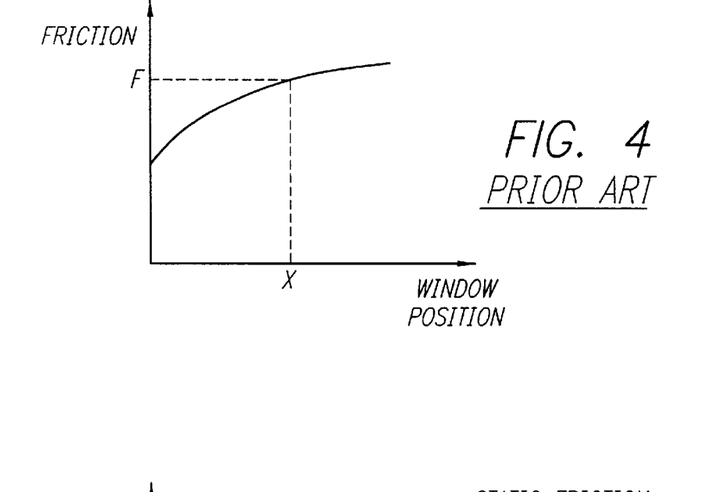
FIG. 4 is a graph illustrating the variation of friction with vertical position of the motor vehicle window as known in the prior art.

The accuracy of the $F_P$ calculation is improved in the present invention by providing a better characterization of the friction operative on the window previously defined as $(F_A+F_B+F_C)$, collectively referred to herein as the frictional force $F_{FRICTION}$. In prior art safety systems, the frictional force $F_{FRICTION}$ is determined in direct relation to the vertical position of the window pane 12. FIG. 4 illustrates a curve depicting the changes in frictional force across the range of vertical positions of the window as used in prior art safety systems. The amount of friction increases as the window pane 12 rises due to the increased surface contact between the edges of the window pane 12 and the leading edge frame 15 and the trailing edge frame 17. As shown in FIG. 4, for a given window position x, the frictional force value $F_{FRICTION}$ taken from the curve is selected for use as the $(F_A+F_B+F_C)$ term in calculating $F_P$. This determination of friction is flawed, however, since it fails to take into account the effect of window velocity on the coefficients of friction.

Figure 5:
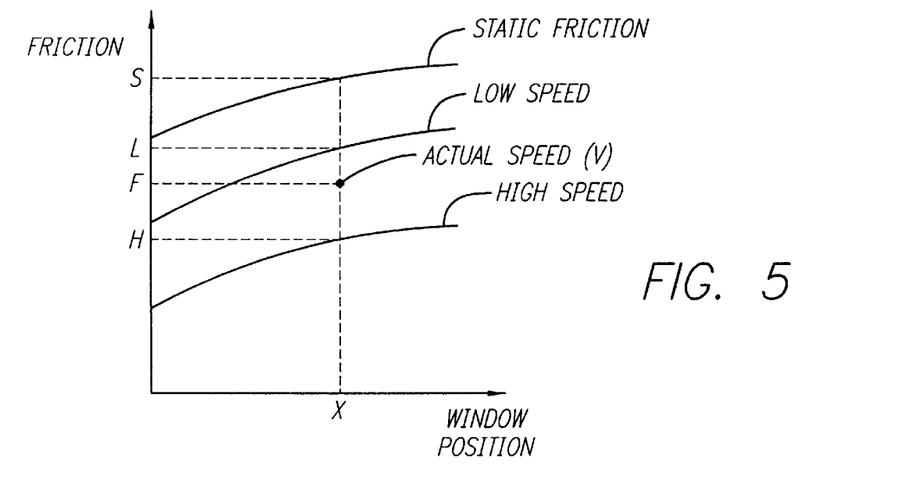
FIG. 5 is a graph illustrating the variation of friction with vertical position and velocity of the motor vehicle window in accordance with the present invention.

Unlike the relatively simple model utilized by the prior art, the amount of the frictional force $F_{FRICTION}$ depends in part upon the upward velocity v of the window pane 12, referred to a dynamic friction. Generally, for a given vertical window position, the amount of friction is reduced as the velocity is increased. Referring now to FIG. 5, three curves are illustrated reflecting static friction, friction at low velocity, and friction at high velocity, respectively, for a range of vertical window positions. The curves are derived during manufacture of the motor vehicle, in which the frictional forces are measured while the window is operated at varying velocities. The low velocity curve represents measured friction values at the lowest expected velocity $V_L$ of window movement, and the high velocity curve represents measured friction values at the highest expected velocity $V_H$ of window movement. The static friction curve represents measured friction values at a velocity substantially below the lowest expected velocity $V_L$, such as during a pinched condition. The data of each of the three curves is stored in non-volatile memory, such as the memory 52 of FIG. 3.

As shown in FIG. 5, for a given window position x, the frictional forces $F_{FRICTION}$ is extrapolated from the high and low velocity curves based on the actual velocity v of window pane movement. The dynamic frictional force $F_{FRICTION}$ is calculated using the following expression:

$$F_{FRICTION} = H + ((L-H)(v-V_H)/(V_L-V_H))$$

where L is the corresponding friction value for the low velocity curve, H is the corresponding friction value for the high velocity curve, $V_L$ is the lowest expected velocity, $V_H$ is the highest expected velocity, and v is the actual measured velocity. As described above, the actual measured velocity v is determined from the pulse trains of one or two of the Hall elements 54a, 54b. If the actual measured velocity v is less than the lowest expected velocity $V_L$, then the static friction value S should be utilized instead of the dynamic frictional force $F_{FRICTION}$ in calculating $F_P$.

A second way to improve the accuracy of the calculation of pinching force $F_P$ is to provide a better characterization of the motor torque $F_{MOTOR}$. As known in the art, the motor torque $F_{MOTOR}$ is calculated using the following expression:

$$F_{MOTOR} = K_t \phi_f I_a$$

where $K_t$ represents the force to torque coefficient, $\phi_f$ represents the magnetic flux, and $I_a$ represents the armature current. Since $K_t$ and $\phi_f$ are assumed to be constants, the motor torque $F_{MOTOR}$ may be determined from a direct measurement of the motor armature current $I_a$. In the alternative, the motor torque $F_{MOTOR}$ may also be determined from a direct measurement of the voltage applied across the motor $V_{MOTOR}$, which relates to the armature current $I_a$ according to the following expressions:

$$V_{MOTOR} = I_a R_a + K_a \phi_f \omega$$

$$F_{MOTOR} = K_t \phi_f ((V_{MOTOR} - K_a \phi_f \omega)/R_a)$$

where $R_a$ is the armature resistance, $K_a$ is the armature constant, and $\omega$ is the motor rotation velocity.

In practice, the actual motor torque $F_{MOTOR}$ produced by the electric motors and associated drive elements used within power windows varies within certain tolerance limits. For example, the voltage applied across the motor $V_{MOTOR}$ provided by the vehicle battery 60 (e.g., approximately 12 volts) fluctuates due to the changing load on the vehicle battery. As a result, an accurate measure of the motor torque cannot be achieved by simply detecting the voltage $V_{MOTOR}$ or current $I_a$. Accordingly, one way to provide a more accurate measure of the motor torque $F_{MOTOR}$ is to adjust the force to torque coefficient $K_t$ specifically for each such drive system, which includes an electric motor, drive gears and associated control circuitry.

Figure 12:
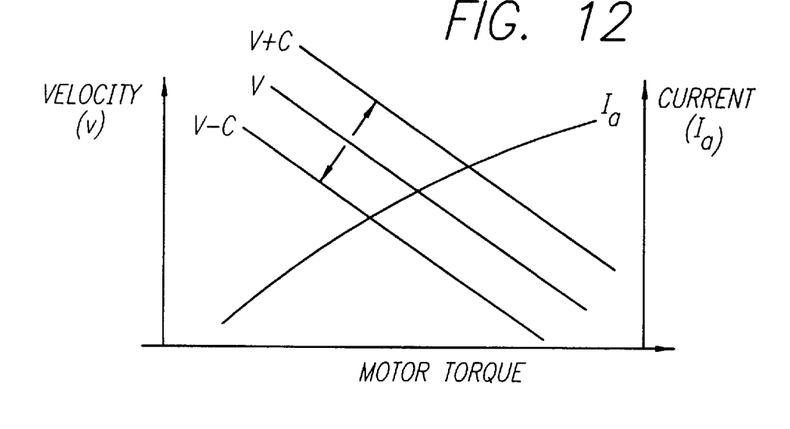
FIG. 12 is a graph illustrating variations in measured torque produced by the power window electric motor.

FIG. 12 is a graph showing variations in measured motor torque $F_{MOTOR}$ produced by a power window drive system in which the electric motor, drive gears and associated control circuitry are coupled together. The center curve shows the characteristics of an average drive system in which the motor torque $F_{MOTOR}$ necessary to achieve different velocity (v) values of the window pane 12 is plotted. The upper and lower curves, respectively, show the variations in motor torque $F_{MOTOR}$ due to tolerance variations (±c). The graph also illustrates the relationship between armature current $I_a$ and motor torque $F_{MOTOR}$. In prior art systems, the force to torque coefficient $K_t$ is taken from the average curve, and the same value is then utilized for all drive systems used within a particular motor vehicle production cycle irrespective of their actual performance.

In contrast, the present invention tests each individual drive system combination to determine precisely where the velocity to motor torque curve lies. A unique force to torque coefficient $K_t$ is then determined for each such drive system combination, which is then stored in the memory 52 of the power window control circuitry (see FIG. 3). The unique force to torque coefficient $K_t$ is thereafter used in the calculation of the motor torque $F_{MOTOR}$ value in the determination of pinching force $F_P$. Alternatively, a torque adjustment factor $F_A$ may be determined for each unique drive system combination, and the adjustment factor $F_A$ multiplied with the average force to torque coefficient $K_t$ to provide a corrected coefficient value.

As noted above, the motor torque $F_{MOTOR}$ measurement may be based on the voltage across the motor $V_{MOTOR}$, which is detected by monitoring the voltage from the vehicle battery 60. Referring briefly to FIG. 9, which is similar to FIG. 3, the CPU 42 monitors the battery voltage through an analog-to-digital converter 62, that provides a digital representation of the battery voltage. It should be appreciated that the control circuitry of FIG. 9 will also include the other elements shown in FIG. 3, which have been omitted for simplicity. The CPU 42 is also coupled to a voltage regulator 58, which converts the 12 volt input voltage from the vehicle battery 60 to a regulated power source (e.g., 5 volts) that is provided to the CPU as well as the electric motor 26. The DC voltage provided by the voltage regulator 58 is used as a reference for comparing the digital representation of the battery voltage. Ideally, the efficiency of the voltage regulator 58 is 100%; however, in practice, the regulated output of the voltage regulator 58 may vary by ±5%. This variation causes inaccuracies in the calculation of the voltage across the motor $V_{MOTOR}$, and ultimately, the motor torque $F_{MOTOR}$ measurement.

Figure 13:
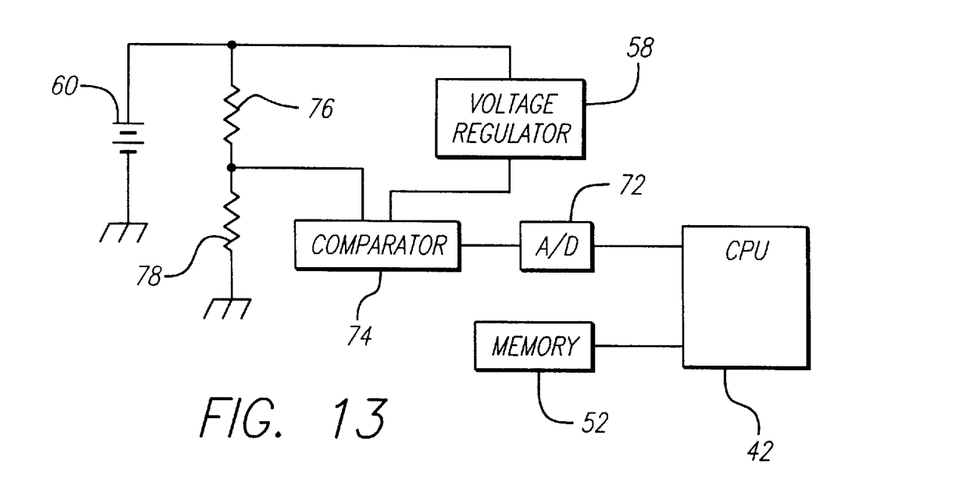
FIG. 13 is a block diagram illustrating a circuit for evaluating the efficiency of a voltage regulator.

In the present invention, a more accurate determination of the voltage regulator efficiency coefficient is made. Referring to FIG. 13, a test circuit is illustrated for accurately determining the efficiency of a voltage regulator 58. The test circuit includes the CPU 42, memory 52 and voltage regulator 58 to be used in a motor vehicle power window system. A vehicle battery 60 is coupled to the voltage regulator 58, which provides a regulated output (e.g., 5 volts ±5%) as known in the art. The vehicle battery 60 is also coupled to a voltage divider circuit comprising resistors 76, 78 coupled in series. The resistances of the resistors 76, 78 may be specifically selected to produce a reference potential (e.g., 5 volts) across the resistor 78. The reference potential and the voltage regulator output are each provided to a comparator 74 which provides a signal corresponding to the difference between the reference potential and the voltage regulator output. The difference signal is then provided to an A/D converter 72, which provides a binary representation of the difference signal to the CPU 42. The CPU 42 then stores the binary reference signal in a location within the memory 52.

During operation of the vehicle safety system, the CPU 42 will use the difference signal to compensate for the variations in the voltage regulator output. For example, if the difference signal indicates that the voltage regulator output is actually less than the reference potential by 2% (e.g., 4.9 volts), then the reference voltage provided by the voltage regulator 58 is corrected by that amount prior to use in evaluating the digital representation of the battery voltage. As a result, a more accurate determination of the voltage across the motor $V_{MOTOR}$ and the motor torque $F_{MOTOR}$ may therefore be obtained.

Figure 8:
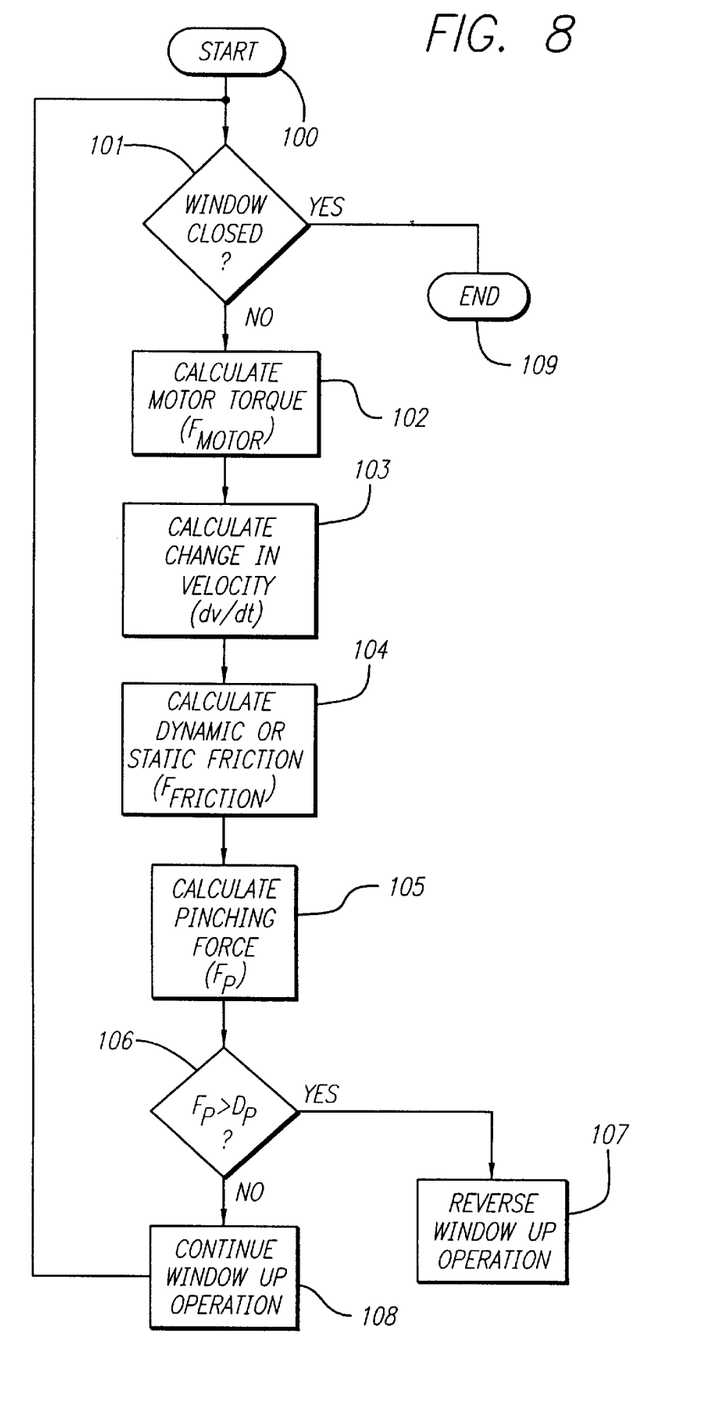
FIG. 8 is a flow chart illustrating operation of the anti-pinch safety system of the present invention.

Referring now to FIG. 8, a flow chart illustrating the operation of the safety system is provided. It should be appreciated that the flow chart may be implemented as a software or firmware program that is executed by the CPU 42, as is generally known in the art. The program is initialized at step 100, such as by an occupant of the motor vehicle manipulating one of the window control switches to the close position. Prior to this initialization step, the position of the window pane 12 based on previously collected data from the Hall sensors 54a, 54b has been stored in a register within the memory 52, as discussed above. At step 101, the program determines from the stored position information whether the window is already closed. If the window is closed, the program ends at step 109.

Conversely, if the window is at least partially open, the program proceeds through a series of steps in which the various coefficients of the pinching force $F_P$ are calculated. At step 102, the motor torque $F_{MOTOR}$ is determined based on the detected voltage across the motor $V_{MOTOR}$ or armature current $I_a$, using the equations discussed above, and corrected by the known voltage regulator efficiency. The unique force to torque coefficient $K_t$ may be utilized in the calculation of motor torque $F_{MOTOR}$, as discussed above. The upward force $F_{UP}$ is calculated by multiplying motor torque $F_{MOTOR}$ with the constant ρ. At step 103, the change in velocity dv/dt is determined from the actual velocity v measured using one or both of the Hall sensor pulse trains. At step, 104, the frictional force $F_{FRICTION}$ is calculated using either the dynamic friction value extrapolated from the high and low speed curves of FIG. 5 based on the actual velocity v, or the static friction value from the same figure. Lastly, at step 105, the pinching force $F_P$ is calculated based on the equations discussed above by determining the frictional force $F_{FRICTION}$ and summing the coefficients determined in the preceding steps.

At step 106, the calculated pinching force $F_P$ is compared against a predetermined maximum pinching force level $D_P$. If the measured pinching force $F_P$ is greater than the predetermined maximum pinching force level $D_P$, then the window movement is immediately halted and window operation is reversed to lower the window. Alternatively, if the measured pinching force $F_P$ is less than or equal to the predetermined maximum pinching force level $D_P$, then the window up operation is continued at step 108. Thereafter, the program loops back to step 101, after which the program repeats continuously until either a pinched condition is detected at step 106 or the window has fully closed at step 109.

Figure 10:
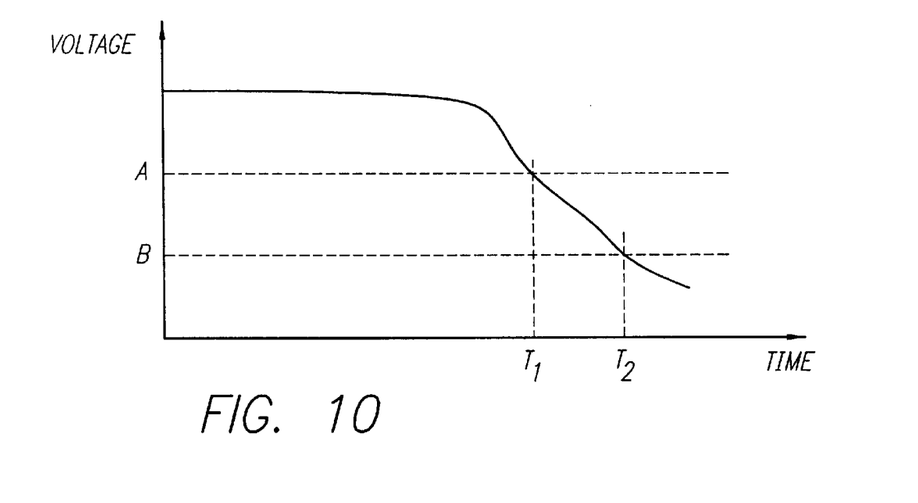
FIG. 10 is a graph illustrating vehicle battery voltage level fluctuations.
Figure 11:
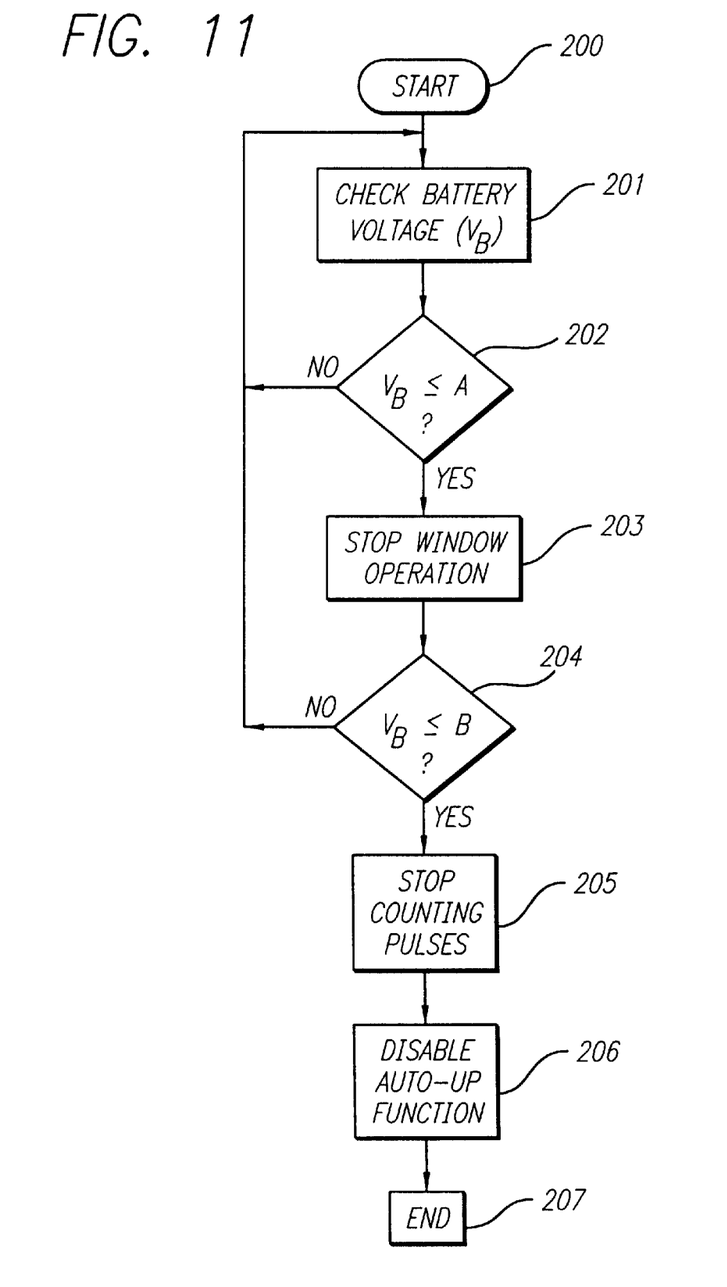
FIG. 11 is a flow chart illustrating operation of the anti-pinch safety system under a low voltage condition.

Referring again to FIG. 9, as well as FIGS. 10–11, another embodiment of the present safety system is provided. As noted above, a drawback with conventional motor vehicle power window systems is that the DC voltage provided by the vehicle battery (generally 12 volts) ($V_B$) is somewhat unreliable. Wide fluctuations in the voltage level from the vehicle battery are common, such as due to cycling of the air conditioning compressor and other electrical systems. In addition to the problems in accurately measuring the motor force $F_{MOTOR}$ discussed above, these voltage fluctuations can also have a detrimental effect on the operation of the CPU 42 used to control the power window safety system.

As discussed above, the CPU 42 keeps track of the position of window pane 12 by counting pulses provided by one of the Hall sensors 54a, 54b (see FIG. 3). If the voltage $V_B$ provided to the CPU 42 momentarily drops below a predefined level, the CPU will reset and, as a result, lose the position data stored therein. While the voltage regulator 58 coupled to the vehicle battery provides a more regulated voltage source to the CPU 42, the regulator is unable to prevent the voltage $V_B$ from dipping below the minimum level necessary to maintain proper operation of the CPU. The loss of position data directly affects the ability of the safety system to detect a pinched condition since the calculation of the frictional forces $F_{FRICTION}$ depends on the position data.

Another power window function affected by the loss of position data is the auto-up function in which the window is moved to the fully closed position by a vehicle occupant briefly toggling the control switch. This function is advantageous since the occupant need not hold the switch down during the entire time that the window is moving. The position data is necessary to this function so that the CPU 42 knows how far to move the window pane 12 when the auto-up function is called. The power window may also include a sensor to provide the CPU 42 with an indication that the window has reached the fully closed position. The CPU 42 can then reestablish the position information and resume counting of pulses from the Hall sensors 54a, 54b. Thus, if the position information is lost due to a voltage fluctuation causing the CPU 42 to reset, the position information can ordinarily be recovered after the window has been manually brought to the fully closed position.

In FIG. 9, a capacitor 66 is coupled across the output of the voltage regulator 58, such that it becomes charged to a voltage equivalent to the regulator output voltage. An analog-to-digital (A/D) converter 62 is coupled to the CPU 42 through a resistor 64 to the vehicle battery 60 at the input to the voltage regulator 58. The A/D converter 62 provides the CPU 42 with a binary representation of the instantaneous battery voltage $V_B$. The CPU 42 uses the battery voltage signal from the AND converter 62 to selectively disable certain functionality in order to reduce the detrimental effects of the lost position information. The operation of the low voltage control feature is illustrated by the flow chart of FIG. 11 with reference to the graph of FIG. 10. It should be appreciated that the flow chart may be implemented as a software or firmware program that is executed by the CPU 42, as is generally known in the art. The program may be executed on a periodic basis, such as part of the initialization of the program described above with respect to FIG. 8.

The program of FIG. 11 is initialized at step 200. At step 201, the CPU 42 checks the battery voltage $V_B$ provided by the A/D converter 62. As shown in FIG. 10, voltage levels A and B are selected such that the CPU 42 is capable of continued operation with the battery voltage $V_B$ in the range between levels A and B, but will shut down if the voltage level falls below voltage level B. In step 202, the battery voltage $V_B$ is compared against voltage level A. If the battery voltage $V_B$ is greater than voltage level A, the program advances to step 204 at which normal window operation is continued. Thereafter, the program returns to other processing at step 206 until it is once again periodically executed. If, however, the battery voltage $V_B$ is less than or equal to voltage level A, as shown at time $t_1$ of FIG. 10, step 203 is executed in which window movement is halted.

Even though the CPU 42 has halted movement of the window, it should be appreciated that there continues to be some additional movement of the window due to inertia. As a result, pulses continue to be provided by the Hall sensors 54a, 54b for a short period of time until the window stops moving. At this time, the capacitor 66 maintains the input power to the CPU 42 at an operational level for a sufficient period of time to count the additional pulses at step 205, even though the battery voltage $V_B$ has dropped to voltage level A. As a result, the CPU 42 continues to maintain accurate position information. Thereafter, the program again returns to other processing at step 206. During a subsequent loop through the program, if the battery voltage level $V_B$ has again returned to a normal level above voltage level A, the halted window operation will resume at step 204. Notably, the CPU 42 will shut down once the battery voltage $V_B$ falls to voltage level B, but the position information will have been stored prior to that time and will be available after the CPU has recovered.

Having thus described a preferred embodiment of an improved anti-pinch safety system for a vehicle closure device, it should be apparent to those skilled in the art that certain advantages of the within system have been achieved. It should also be appreciated that thereof may be modifications, adaptations, and alternative embodiments thereof may be made within the scope and spirit of the present invention. The invention is further defined by the following claims.

What is claimed is:

1. A safety apparatus for operating a motor vehicle opening device, comprising:
   an electric motor operatively coupled to said vehicle opening device to move said vehicle opening device between an open position and a closed position;
   a sensor operatively coupled to said electric motor for sensing velocity of movement of said vehicle opening device; and
   a processor operatively coupled to each of said sensor and said electric motor, and a memory containing stored instructions to be executed by said processor, said stored instructions including:
      calculating a pinching force of said vehicle opening device in accordance with changes in velocity sensed by said sensor;
      detecting a pinched condition by comparing said pinching force to a predetermined force value; and
      stopping closing movement of said vehicle opening device when said pinched condition is detected.

2. The safety apparatus of claim 1, wherein said pinching force is calculated by said processor using the formula:

$$F_P = F_{MOTOR}\rho - (F_A + F_B + F_C) - mg - m\, dv/dt$$

wherein $F_P$ is said pinching force, $F_{MOTOR}$ is torque of said electric motor, $\rho$ is an efficiency constant for said vehicle opening device, $F_{FRICTION}$ is frictional force operative on said vehicle opening device, m is mass of said vehicle opening device, g is acceleration of gravity, and dv/dt is change in velocity of said vehicle opening device.

3. The safety apparatus of claim 2, wherein said frictional force $F_{FRICTION}$ is dependent at least in part upon said velocity detected by said sensor.

4. The safety apparatus of claim 2, wherein said frictional force $F_{FRICTION}$ comprises a static friction value when said velocity is below a lowest expected value.

5. The safety apparatus of claim 2, wherein said motor torque $F_{MOTOR}$ is calculated by said processor using the equation:

$$F_{MOTOR} = K_t \phi_f I_a$$

where $K_t$ is a force to torque coefficient, $\phi_f$ is magnetic flux, and $I_a$ is armature current.

6. The safety apparatus of claim 2, further comprising a voltage regulator coupled to said processor, said voltage regulator having an efficiency coefficient that is adjusted by a stored value corresponding to measured tolerance variation of said voltage regulator to provide an accurate voltage output to said processor.

7. The safety apparatus of claim 1, wherein said sensor further comprises at least two Hall sensors which are offset from each other by a predetermined amount with respect to a rotary shaft of said electric motor, said Hall sensors providing respective pulse sequences comprised of rectangular pulses, said velocity being determined from a measured time difference between at least one of rising positive edges and falling negative edges of corresponding ones of said rectangular pulses of said pulse sequences.

8. The safety apparatus of claim 1, further comprising:
   a vehicle power supply providing electrical power for operation of said processor;
   a voltage sensor responsive to said vehicle power supply for sensing a voltage level of said vehicle power supply; and
   a temporary power source adapted to provide electrical power to said processor sufficient to continue operating upon said voltage level sensed by said voltage sensor being below a predetermined first level.

9. The safety apparatus of claim 8, wherein said processor stops operation of said electric motor responsive to said voltage level sensed by said voltage sensor being below said predetermined first level.

10. The safety apparatus of claim 8, wherein said processor stops operating altogether responsive to said voltage level sensed by said second sensor being below a predetermined second level lower than said predetermined first level.

11. A method for operating a motor vehicle opening device, comprising:
   moving said vehicle opening device between an open position and a closed position;
   sensing velocity of movement of said vehicle opening device;
   calculating a pinching force of said vehicle opening device in accordance with sensed changes in said velocity of movement of said vehicle opening device;
   detecting a pinched condition by comparing said pinching force to a predetermined force value; and
   stopping movement of said vehicle opening device when a pinched condition is detected.

12. The method of claim 11, wherein calculating step further comprises calculating said pinching force using the equation:

$$F_P = F_{MOTOR}\rho - (F_A + F_B + F_C) - mg - m\, dv/dt$$

wherein $F_P$ is said pinching force, $F_{MOTOR}$ is torque of said electric motor, $\rho$ is an efficiency constant for said vehicle opening device, $F_{FRICTION}$ is frictional force operative on said vehicle opening device, m is mass of said vehicle opening device, g is acceleration of gravity, and dv/dt is change in velocity of said vehicle opening device.

13. The method of claim 12, wherein said calculating step further comprises calculating said frictional force $F_{FRICTION}$ in accordance with said sensed velocity.

14. The method of claim 12, wherein said calculating step further comprises selecting a static friction value for said frictional force $F_{FRICTION}$ when said sensed velocity is below a lowest expected value.

15. The method of claim 12, wherein said calculating step further comprises calculating said motor torque $F_{MOTOR}$ using the equation:

$$F_{MOTOR} = K_t \phi_f I_a$$

where $K_t$ is a force to torque coefficient, $\phi_f$ is magnetic flux, and $I_a$ is armature current.

16. The method of claim 11, wherein said step of sensing velocity further comprises providing at least two pulse sequences out of phase with each other by a predetermined amount, said pulse sequences each being comprised of rectangular pulses in which each one of said pulses corresponds to a fixed increment of movement of said vehicle opening device, and determining from a measured time difference between at least one of rising positive edges and falling negative edges of corresponding ones of said rectangular pulses of said pulse sequences.

17. An apparatus for operating a motor vehicle opening device, comprising:

a vehicle power supply;

an electric motor operatively coupled to said vehicle opening device to move said vehicle opening device between an open position and a closed position;

a first sensor operatively coupled to said electric motor for sensing velocity of movement of said vehicle opening device;

a second sensor responsive to said vehicle power supply for sensing a voltage level of said vehicle power supply;

a processor operatively coupled to each of said first and second sensors and said electric motor, said vehicle power supply providing electrical power for operation of said processor, said processor detecting whether an object is pinched by said vehicle opening device responsive to said velocity sensed by said first sensor; and a temporary power source adapted to provide electrical power to said processor sufficient to continue operating upon said voltage level sensed by said second sensor being below a predetermined first level.

18. The apparatus of claim 17, wherein said processor stops operation of said electric motor responsive to said voltage level sensed by said second sensor being below said predetermined first level.

19. The apparatus of claim 18, wherein said processor stops operating altogether responsive to said voltage level sensed by said second sensor being below a predetermined second level lower than said predetermined first level.

20. The apparatus of claim 17, wherein said first sensor further comprises at least two Hall sensors which are offset from each other by a predetermined amount with respect to a rotary shaft of said electric motor, said Hall sensors providing respective pulse sequences comprised of rectangular pulses, said velocity being determined from a measured time difference between at least one of rising positive edges and falling negative edges of corresponding ones of said rectangular pulses of said pulse sequences.

21. The apparatus of claim 17, further comprising a memory accessible by said processor and containing stored instructions to be executed by said processor, said stored instructions including:

calculating a pinching force of said vehicle opening device in accordance with changes in velocity sensed by said first sensor;

detecting a pinched condition by comparing said pinching force to a predetermined force value; and stopping closing movement of said vehicle opening device when said pinched condition is detected.

22. The apparatus of claim 17, further comprising a voltage regulator coupled to said processor, said voltage regulator having an efficiency coefficient that is adjusted by a stored value corresponding to measured tolerance variation of said voltage regulator to provide an accurate voltage output to said processor.

23. The apparatus of claim 21, wherein said pinching force is calculated by said processor using the formula:

$$F_P = F_{MOTOR}\rho - (F_A + F_B + F_C) - mg - m\, dv/dt$$

wherein $F_P$ is said pinching force, $F_{MOTOR}$ is torque of said electric motor, $\rho$ is an efficiency constant for said vehicle opening device, $F_{FRICTION}$ is frictional force operative on said vehicle opening device, m is mass of said vehicle opening device, g is acceleration of gravity, and dv/dt is change in velocity of said vehicle opening device.

24. The safety apparatus of claim 23, wherein said frictional force $F_{FRICTION}$ is dependent at least in part upon said velocity detected by said first sensor.

* * * * *